United States Patent [19]

Pellerite

[11] 4,240,320

[45] Dec. 23, 1980

[54] HEADJOINT STOPPER

[76] Inventor: James J. Pellerite, 109 N. Glenwood Ave. W., Bloomington, Ind. 47401

[21] Appl. No.: 132,371

[22] Filed: Mar. 21, 1980

Related U.S. Application Data

[63] Continuation-in-part of Ser. No. 964,048, Nov. 27, 1978, abandoned.

[51] Int. Cl.[3] .......... G01D 7/02

[52] U.S. Cl. .......... 84/384

[58] Field of Search .......... 84/380, 384

[56] References Cited

U.S. PATENT DOCUMENTS 1,376,004 4/1921 Christensen .......... 84/384

FOREIGN PATENT DOCUMENTS 2437304 2/1975 Fed. Rep. of Germany .......... 84/384

369459 1/1907 France .......... 84/384

2563 2/1895 United Kingdom .......... 84/384

*Primary Examiner*—Lawrence R. Franklin

*Attorney, Agent, or Firm*—Woodard, Weikart, Emhardt & Naughton

[57] ABSTRACT

A headjoint stopper for the headjoint of a flute includes a concave bottom disc member having an externally threaded stem axially extending from the back side, a deformable, ring-like sealing member positioned against the back side of the bottom disc, a clamping washing and a hex nut threadedly received on the externally threaded stem. The bottom disc member has an external configuration sized to fit the inside of the headjoint with metal-to-metal contact around the entire circumference of the bottom disc member. The externally threaded stem is integral with the bottom disc such that as the hex nut is advanced along the stem toward the bottom disc, the clamping washer is forced against the sealing member and the sealing member is thereby compressed between the bottom disc and the clamping washer. With the headjoint stopper properly positioned within the headjoint relative to the embouchure hole, the advancement of the hex nut causes the thickness of the sealing member to decrease which results in a corresponding increase in peripheral length. This increase in peripheral length causes the sealing member to expand against the inside diameter of the headjoint irrespective of any out-of-round condition and thereby forms an air-tight seal.

17 Claims, 4 Drawing Figures

HEADJOINT STOPPER

CROSS-REFERENCE TO RELATED APPLICATION

This application is a continuation-in-part application of Ser. No. 964,048 filed Nov. 27, 1978, now abandoned.

BACKGROUND OF THE INVENTION

This invention relates in general to headjoints for musical instruments of the flute family and in particular to headjoint stoppers.

Flutes of today, including concert flutes and piccolos, are often constructed of metal and include a body portion which is detachably connected to a headjoint. The body portion includes the fingerholes and keys and the headjoint includes the embouchure hole and embouchure plate. Received in the free end of the headjoint is a stopper which is anchored to the crown fitting by threaded engagement. Although the body portion is generally cylindrical, the headjoint is typically a drawn or extruded member having a slightly tapering inside diameter. The end of the headjoint which attaches to the body portion is slightly larger than the opposite free end and thus the stopper is normally inserted from this larger end.

For preferred flute response, resonance and brilliance of tone quality, the geometry of the stopper, its position with respect to the embouchure hole and its ability to seal around the inside diameter of the headjoint are all important factors. Although stopper designs of today are often quite similar, there have been several attempts at improving the tone quality of flutes by modifying the headjoint or headjoint stopper. The following listed patents disclose some of the designs which have been conceived for tone quality improvement of musical instruments and/or for ease of positioning the headjoint stopper in the headjoint of flutes and piccolos.

| Country | Patent No. | Patentee | Issue Date |
|---|---|---|---|
| U.S. | 1,106,249 | Smenner | 8/04/14 |
| U.S. | 920,471 | Jenner | 5/04/09 |
| U.S. | 1,013,037 | Melfi | 12/26/11 |
| U.S. | 859,714 | Wurlitzer | 7/09/07 |
| U.S. | 3,763,737 | Sandner | 10/09/73 |
| U.S. | 4,058,046 | Fajardo | 11/15/77 |
| U.S. | 1,376,004 | Christensen | 4/26/21 |
| U.K. | 2,563 | Lillicrap | 12/07/95 |
| France | 369,459 | Cousesnon | 11/13/06 |

Smenner discloses a pitch-regulating device for ocarinas wherein an apertured casing is fitted over a vent of the instrument and includes a slide to close the openings in the casing. The vent may be increased or decreased in order to adjust the pitch of the instrument.

Jenner discloses a flute having a shortened separate mouthpiece which includes the embouchure hole and the free end is fitted with a tuning plug. The tuning plug has a hard wax facing which may be sanded down in order to adjust the overall length of the tuning plug.

Melfi discloses a flute attachment which can be applied either to the conventional flute head or to a specially constructed head and causes the instrument to produce a double tone.

Wurlitzer discloses a flute wherein a circular shoulder is provided at a predetermined distance from the embouchure hole such that the headjoint stopper may be repeatedly removed and then repositioned without being concerned about reestablishing the proper stopper to embouchure hole spacing.

Sandner discloses a flute having a cylindrical bore whose embouchure hole end is closed by a stopper and axially extending through the interior end of the stopper is a cylindrical plug. The length of the plug may be adjusted in order to obtain a true tuning of all notes.

Fajardo discloses a cylindrical headjoint which has an internal cross section that tapers down from a cylindrical shape at the tenon to a noncylindrical shape at the embouchure end by means of a wedge inserted into the headjoint.

Christensen discloses a headpiece for metallic piccolos wherein an internally threaded cap receives a stopper for closing the embouchure hole end. The stopper includes a flat head adjacent the embouchure hole, a washer and a cylindrical cork member disposed therebetween.

Lillicrap discloses a flute or the like in which the headjoint stopper includes a pair of discs B and C with an expandable rubber member between the discs. The rubber member is expanded by forcing the discs together squeezing the rubber member into contact with the head of the flute or the like. Because the Lillicrap device is intended to seal various sizes of headjoints, the disc B is smaller in diameter than the I.D. of the headjoint and therefore, disc B cannot seal at its periphery.

The French patent to Cousesnon discloses a flute and a headjoint stopper wherein the headjoint stopper has a concave cap backed up by a cork. Because the cork is being used, the diameter of the disc is smaller and the disc does not seal at its periphery.

Although the devices disclosed by these various references may prove interesting due to their variety, flutes of today typically include a headjoint stopper similar to the design of Christensen. These current designs include a generally cylindrical section of cork which is faced on one end with a metal plate and on the opposite end with a threaded member which is received by the crown fitting disposed in the free end of the headjoint. Since an air-tight seal in the headjoint is imperative, the cork's function is to seal closed the end of the headjoint and the metal plate serves to direct the air column into the body portion of the flute. It is known that for best tonal quality and proper pitch relationship within the octaves, the metal plate should be located with respect to the center of the embouchure hole at a distance equal to the inside diameter of the headjoint taken at the center of the embouchure hole. In order to accommodate tolerance variations and to assure that the cork does the sealing, the metal plate is made smaller than the inside diameter of the headjoint while the cork is somewhat larger than this inside diameter so that the cork will securely seal when inserted into the headjoint.

Cork, when used as a stopper, has the advantages of being lightweight, easily shaped, moderately compressible and low cost. However, cork has the disadvantage of deteriorating with exposure to moisture and actually decreases in size in a very short time. Since the cork must be assembled to the metal end plate and drilled in order to provide for the threaded member, tolerance variations or inaccuracies must be provided for by making the outside diameter of the metal end plate sufficiently smaller than the outside diameter of the cork member. What results is a halo of exposed cork around the outside diameter of the metal end plate between the end plate and the inside diameter of the headjoint, and this exposes the cork member to moisture. With time the size of the crevice between the metal end plate and the inside diameter of the headjoint increases. Consequently, the cork stopper will begin to develop air leaks which gradually become worse. This problem may be referred to as the "halo effect." However, the flutist may be unaware of such leaks since the deterioration is gradual. A further problem which may accelerate the development of air leaks is the quality of cork which may be obtained for the fabrication of such headjoint stoppers. If the cork is porous, then the deterioration will be more rapid. With such air leaks, the actual seal of the stopper against the inside diameter of the headjoint occurs at a location further along the stopper beyond the metal end plate. This results in a sluggishness in the response of the flute which is undesirable.

A further disadvantage with conventional stopper designs is that the flat metal end plate presents a sharp corner with respect to the inside diameter of the headjoint. Such sharp corners delay the flow of the air column due to the particular flow pattern and thus it would be an improvement to reduce the degree of corner sharpness of the metal end plate relative to the headjoint inside diameter. Such a reduction in corner sharpness permits responsive articulation of the flute and aids in the production of more secure legato. The invention disclosed herein overcomes each of these disadvantages and provides other improvements in the design of headjoint stoppers as will be apparent.

SUMMARY OF THE INVENTION

One embodiment of the present invention might include a headjoint stopper for the headjoint of a flute wherein the headjoint includes a bottom disc member having a concave embouchure-hole-facing side and a back side and having an external configuration sized to fit the inside of said headjoint with metal-to-metal contact around the entire circumference of said bottom disc providing a seal between said headjoint and disc. A deformable sealing member is positioned against the back side of the disc and is compressed against the back side to expand the sealing member against the headjoint. There may also be provided a cork dampener positioned in the chamber defined by the inside of the headjoint, the crown fitting and the headjoint stopper.

One object of the present invention is to provide an improved headjoint stopper.

Related objects and advantages of the present invention will be apparent from the following description.

DESCRIPTION OF THE PREFERRED EMBODIMENT

Figure 1:
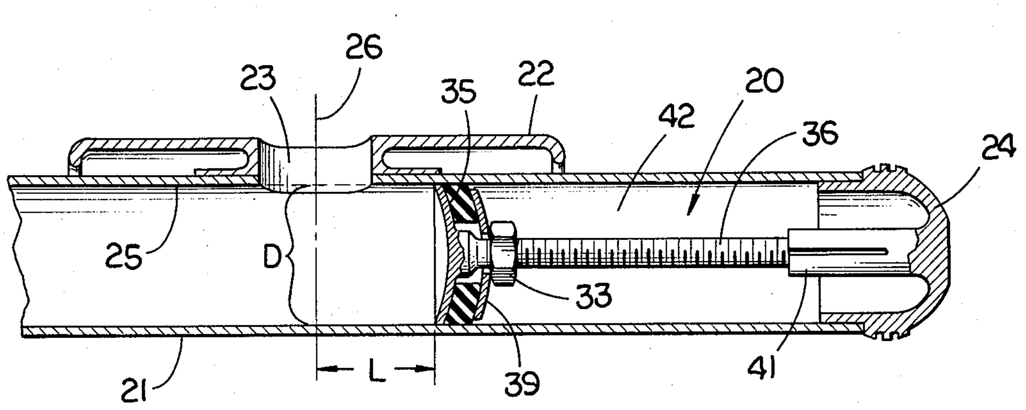
FIG. 1 is a longitudinal sectional view of a headjoint stopper according to a typical embodiment of the present invention as installed in the headjoint of a flute.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated a headjoint stopper as installed in the headjoint 21 of a flute. Although the term "flute " is used herein, it is to be understood that this term refers generally to musical instruments of the flute family. Such instruments include concert flutes and piccolos. Headjoint 21 is that portion which attaches to the body portion of the flute and includes an embouchure plate 22, embouchure hole 23 and crown fitting 24. In order to provide good tone quality and quick response in the flute, there are two primary design considerations with any headjoint stopper. One of these two primary considerations is that the headjoint stopper provide a complete air-tight seal around the inside diameter of the headjoint at a location between the embouchure hole and the crown fitting 24. The other design consideration is that the distance from the end of the headjoint stopper to the centerline of the embouchure hole, as indicated by the letter L be equal to the inside diameter of the headjoint as taken in a vertical plane (as viewed in FIG. 1) passing through the center of the embouchure hole 23, as indicated by the letter D. This vertical plane is indicated by line 26. Although headjoints and flutes in general are attempted to be fabricated in an accurate and consistent manner, what often occurs are slight size and tolerance variations such that each headjoint may be considered as virtually a unique item. For this reason, and in part due to the fact that headjoints are typically made by an extruding process or drawing process, the inside diameter measurement of the headjoint in the plane passing through the embouchure hole is often variable from one headjoint to the other. Consequently the headjoint stopper must be custom-fitted to each headjoint size. A further complication due to the manufacturing technique of headjoints is that the inside diameter of the headjoint may not be truly circular but rather may be out-of-round or elliptical. When this occurs, a cylindrical section of cork does not provide a suitable air-tight seal. However, the design arrangement of headjoint stopper 20 as will be apparent from its following structural description does provide novel means for complete satisfaction of both design considerations.

Figure 2:
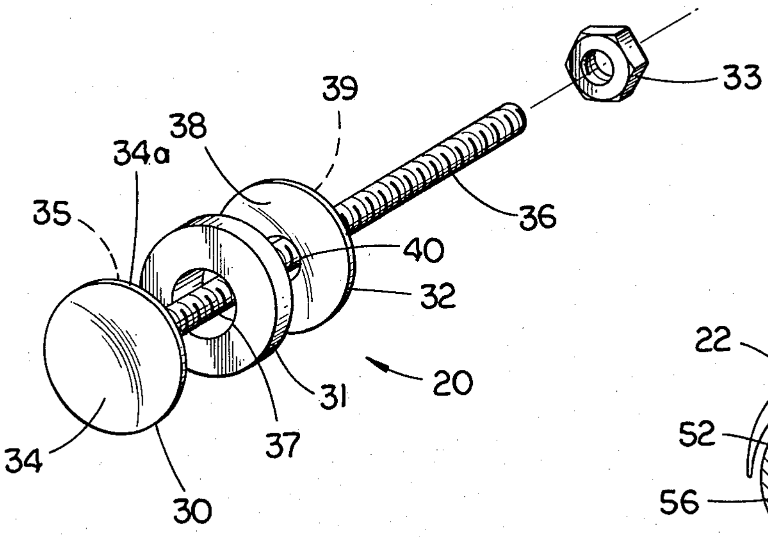
FIG. 2 is an exploded view of the FIG. 1 headjoint stopper.
Figure 4:
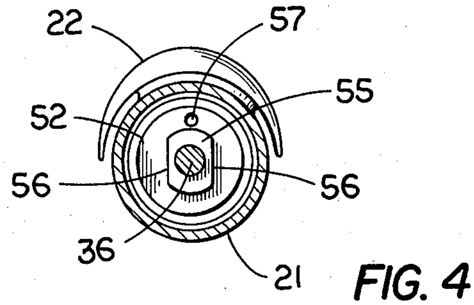
FIG. 4 is a transverse section taken along the line 4—4 of FIG. 3 in the direction of the arrows.

Referring to FIG. 2, headjoint stopper 20 is illustrated as an exploded view and includes a metal bottom disc 30, a deformable ring-like member 31, a metal plate washer 32 and a hex nut 33. Metal bottom disc 30 includes a concave, embouchure hole-facing surface 34 and a convex back side 35 which is correspondingly curved and sized with respect to surface 34 such that the thickness of metal bottom disc 30 is substantially the same throughout. Surface 34 of bottom disc 30 is a smooth, polished surface and bottom disc 30 may be fabricated of a nickel-silver alloy or silver-plated brass, for example. Integral with metal bottom disc 30 is an externally threaded stem 36 which extends outwardly from back side 35 and is concentric with back side 35 and surface 34. Deformable ring-like member 31 may be, for example, a neoprene grommet or O-ring and includes a center hole 37 through which stem 36 extends. Metal plate washer 32 is also a concave member of generally uniform thickness wherein front surface 38 is concave and back surface 39 is convex. Washer 32 also includes a clearance hole 40 which is concentric to the outside diameter of plate washer 32 and stem 36 extends through hole 40. When internally threaded hex nut 33 is received on stem 36 and is drawn against plate washer 32, plate washer, ring-like member 31 and bottom disc 30 are all clamped together into a tightly sandwiched plug member.

The outside surface 34*a* of the disc 30 is sized so as to make a seal at its periphery with a metal-to-metal contact around its entire circumference between the inside surface 25 of the headjoint and the surface 34*a*. To further enhance an air-tight seal at the interface between surface 34*a* and surface 25 and to firmly hold the disc 30 in place, resiliently deformable ring-like member 31 is compressed by means of pressure applied by nut 33. It should be understood, however, that the seal between the disc and the inside surface makes possible playing the flute without compressing the member 31. The maximum tolerance between the disc 30 and the headjoint should be 0.001" (one one-thousandth of an inch) all the way around the disc. The disc 30 actually brings the headjoint into its configuration if it is out-of-round. Therefore, the halo is eliminated.

Although deformable ring-like member 31 is described as a neoprene grommet or O-ring, it is an advantage for the periphery of member 31 to be cylindrical so as to provide a full thickness of surface area around its entire periphery for contact with the inside surface 25 of headjoint 21. With headjoint stopper 20 located at distance L from the centerline of the embouchure hole and with the crown fitting 24 removed, a suitable styled nut driver is able to extend over stem 36 and reach hex nut 33. As nut 33 is advanced on stem 36 in the direction of metal plate washer 32, metal plate washer 32 compresses ring-like member 31 and reduces the overall thickness of member 31. Inasmuch as member 31 is a rubber or rubber compound, although similar materials may be suitable, the overall volume remains virtually the same regardless of the shape it assumes. Consequently, a decrease in thickness of member 31 causes an increase in perimeter length. This increase in perimeter length causes the outside diameter dimension of member 31 to increase and to expand outwardly into tight-sealing and firm-positioning engagement with inside surface 25. The more nut 33 is tightened against washer 32, the greater the compression of member 31 and correspondingly the greater the diameter growth of member 31.

In the event it would be necessary to replace one or more of the component pieces of headjoint stopper 20, removal and disassembly is easily accomplished by first removing the crown fitting 24 and then loosening nut 33. Once member 31 is allowed to return to its free-state shape, there will no longer be tight engagement with inside surface 25 and headjoint stopper 20 may be pushed outwardly toward the large end of headjoint 21. When headjoint stopper 20 is positioned in the headjoint and tightened into place, crown fitting 24 has an internally threaded protruding portion 41 (see FIG. 1) which mates with the free end of externally threaded stem 36. This threaded engagement between crown fitting 24 and stem 36 further facilitates the positioning and retention of headjoint stopper 20 at its desired location. This is important because if the disc 30 is crooked, excessive air mass will be trapped.

Although the two primary design considerations are the proper locating of the headjoint stopper and the achievement of an air-tight seal, there is yet a further concern involved with producing a more responsive tone quality and a more immediate articulation. This other consideration involves the surface geometry of the headjoint stopper with respect to the inside surface 25 of the headjoint. It is known that utilizing a flat plate as the embouchure hole-facing surface of the headjoint stopper results in a sharp corner between the inside diameter of the headjoint and the surface, completely around the circumference of this inside diameter. It is also known that with such "corners" in the headjoint that the flow of the air column is influenced. It is further known that moderate reductions in the sharpness of such corners can result in significant tonal improvements. Therefore, in order to reduce the effect of such "corners" and to aid the flow of the air column, the design disclosed herein provides a concave surface 34 as the embouchure hole-facing surface such that in lieu of sharp corners between these two members, the included angle is greater than 90 degrees and there is a gradual curve. This more gradual curve affects the air column and improves the articulation of the flute.

The present headjoint stopper provides an open chamber 42 which results in improved resonance over the prior art cork construction which normally fills this chamber in whole or in part. This improved resonance was previously unknown as is evidenced by the comments of the many pleased performers who have used the present invention.

Figure 3:
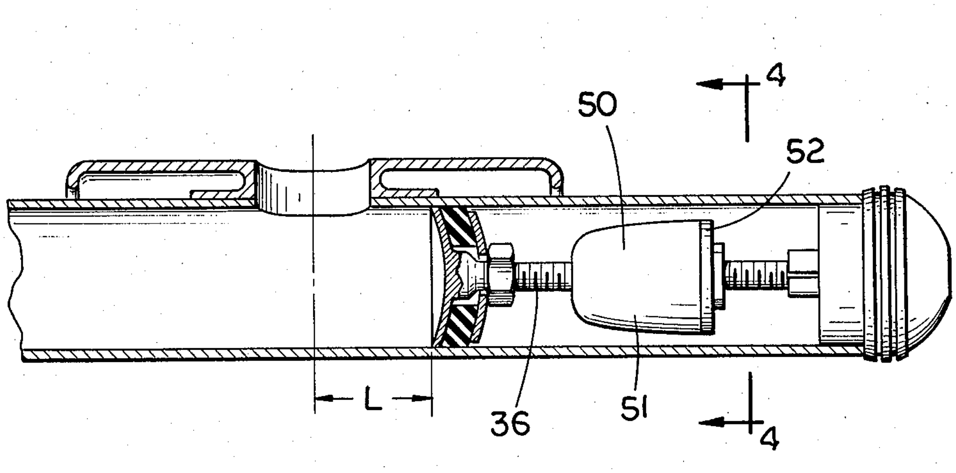
FIG. 3 is a view similar to FIG. 1 of an alternative embodiment of this invention.

Referring to FIG. 3, there is illustrated an embodiment of the invention which is identical to the embodiment of FIGS. 1 and 2 except that the stem 36 has threadedly received thereon an acoustical dampener 50 of cork. Because the present invention eliminates the prior art cork, a resonant chamber is provided which magnifies the acoustical characteristics in the headjoint. The response of the flute also is influenced, and its tone color, with more refined qualities, may be adjusted by moving the dampener 50 on the stem 36. The dampener 50 has a cork portion 51 and a brass portion 52. The raised shoulder 55 has opposed flat surfaces 56 which can be grasped by a tool for turning the dampener on the stem 36. Also the dampener can be adjusted as to position by a pin placed in the hole 57 for turning the dampener on the stem 36.

The dampener 50 can face either direction; that is, with the end (portion 52) toward the cap 24 or the cork 51 toward the cap 24. If the cork 51 is toward the cap, a pin can be used to rotate the dampener on the stem 36. Since each headjoint may respond with varied characteristics, the performer can experiment with the position and facing of the cork. As a result of the greater reasonance in headjoint response through the use of the invention, the dampener functions to control excessive vibrations that occur in certain areas of the flute in some headjoints. The size of cork 51 is varied, depending on the need of the headjoint; although in one embodiment of the invention, the maximum diameter is two-thirds of the inside diameter (25) of the headjoint. The size of the cork should be determined based upon the weight of the headjoint tube which is determined by the thickness of the material, the range normally being 0.012" to 0.018".

All of the disclosed embodiments of the present invention provide improved response characteristics. The halo effect is eliminated. A new vibrating characteristic in the headjoint results in an enhancement of the headjoint's ability to respond to the performer's technical demands. Tonal brilliance and contrasts in timbre (tonal color) are the notable sound characteristics. Tone center is achieved by the performer with greater ease. A more accurate pitch discrimination results with greater subtleties in executing tone production for finer intonation.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A headjoint stopper for the headjoint of a flute, said headjoint stopper comprising:
   - a bottom disc member having a concave embouchure-hole-facing side and a back side and having an external configuration sized to fit the inside of said headjoint with metal-to-metal contact around the entire circumference of said bottom disc member providing a seal between said headjoint and disc;
   - a deformable sealing member positioned against said back side; and
   - means for compressing said deformable sealing member against said back side whereby the thickness of said deformable sealing member is decreased while the perimeter length of said deformable sealing member is increased.

2. The headjoint stopper of claim 1 wherein said bottom disc member includes an integral threaded stem and said compressing means includes a washer disposed on said stem and a nut threadedly received by said stem.

3. The headjoint stopper of claim 2 wherein said deformable sealing member is a ring-like neoprene member and is disposed on said stem.

4. A headjoint stopper for the headjoint of a flute, said headjoint stopper comprising;
   - a bottom disc having a concave embouchure-hole-facing side, a back side and an integral externally threaded stem portion axially extending from said back side, said bottom disc having an external configuration sized to fit the inside of said headjoint with metal-to-metal contact around the entire circumference of said bottom disc providing a seal between said headjoint and disc;
   - a deformable, ring-like sealing member disposed over said stem portion and concentric with said bottom disc;
   - a clamping plate disposed over said stem portion and concentric with said bottom disc, said deformable, ring-like sealing member disposed between the back side of said bottom disc and said clamping plate; and
   - an internally threaded member received by said stem portion and threadedly advanceable toward said bottom disc for compressing said deformable, ring-like member whereby the thickness of said deformable, ring-like member is decreased and the perimeter length is increased.

5. The headjoint stopper of claim 4 wherein said deformable, ring-like member is of a neoprene composition and has a generally cylindrical periphery.

6. The headjoint stopper of claim 5 wherein said clamping plate is concave and said internally threaded member is a hex nut.

7. In combination:
   - a flute headjoint including an embouchure hole and a crown fitting; and
   - a headjoint stopper disposed within said headjoint for sealing the headjoint between the embouchure hole and crown fitting, said headjoint stopper comprising:
   - a bottom disc member having a concave embouchure-hole-facing side and a back side, said bottom disc member being in metal-to-metal contact with said headjoint around the entire circumference of said bottom disc member providing a seal between said headjoint and said disc member;
   - a deformable sealing member positioned against said back side; and
   - means for compressing said deformable sealing member against said back side whereby the thickness of said deformable sealing member is decreased while the perimeter length of said deformable sealing member is increased.

8. The combination of claim 7 wherein said bottom disc member includes an integral threaded stem and said compressing means includes a washer disposed on said stem and a nut threadedly received by said stem.

9. The combination of claim 8 wherein said deformable sealing member is a ring-like neoprene member and is disposed on said stem.

10. The combination of claim 7 wherein the included angle in any axial plane between the inside diameter of the headjoint and the bottom disc member is greater than 90 degrees.

11. The combination of claim 10 wherein said headjoint stopper is positioned relative to the center of said embouchure hole at a distance equal to the inside diameter of the headjoint at a location corresponding to the center of said embouchure hole.

12. The combination of claim 11 wherein said nut is accessible from the crown fitting end of said headjoint once said crown fitting is removed.

13. The combination of claim 12 wherein said crown fitting has an internally threaded portion and said headjoint stopper and said crown fitting are held together by means of the threaded engagement of said internally threaded portion and said threaded stem.

14. A headjoint stopper for the headjoint of a flute, said headjoint stopper comprising:
   - a bottom disc member having a concave embouchure-hole-facing side and a back side and having an external configuration sized to fit the inside of said headjoint with metal-to-metal contact;
   - a deformable sealing member positioned against said back side;
   - means for compressing said deformable sealing member against said back side whereby the thickness of said deformable sealing member is descreased while the perimeter length of said deformable sealing member is increased;
   - a crown fitting mounted on the headjoint so as to close off the end of the headjoint and define a chamber within said headjoint and between said headjoint stopper and said crown fitting;
   - a stem attached to said bottom disc member and extending into said chamber; and
   - a cork dampener mounted on said stem within said chamber and of sufficiently small size to be spaced from the headjoint.

15. The headjoint stopper of claim 14 wherein said stem is threaded and said dampener is adjustable as to position on said stem.

16. In combination:

a flute headjoint including an embouchure hole and a crown fitting; and a headjoint stopper disposed within said headjoint for sealing the headjoint between the embouchure hole and crown fitting, said headjoint stopper comprising:

a bottom disc member having a concave embouchure-hole-facing side and a back side, said bottom disc member being in metal-to-metal contact with said headjoint around the entire circumference of said bottom disc member providing a seal between said headjoint and said disc member;

a deformable sealing member positioned against said back side;

means for compressing said deformable sealing member against said back side whereby the thickness of said deformable sealing member is decreased while the perimeter length of said deformable sealing member is increased;

said crown fitting being mounted on the headjoint so as to close off the end of the headjoint and define a chamber within the headjoint and between the headjoint stopper and the crown fitting;

a stem attached to said bottom disc member and extending into said chamber, said stem being threaded and threadedly mounting said crown fitting; and a cork dampener threadedly mounted on said stem within said chamber and of sufficiently small size to be spaced from the inside walls of said headjoint at said chamber, said dampener being adjustable longitudinally of said stem by rotation on said stem.

17. The combination of claim 16 wherein said cork dampener includes a brass portion which provides the threaded mounting on said stem and a hole in said brass portion for rotating said dampener.

* * * * *